No. 776,091. PATENTED NOV. 29, 1904.
R. SCHLEGELMILCH.
SHEARS FOR CUTTING T OR OTHER ANGLE IRON.
APPLICATION FILED FEB. 4, 1904.
NO MODEL. 2 SHEETS—SHEET 1.

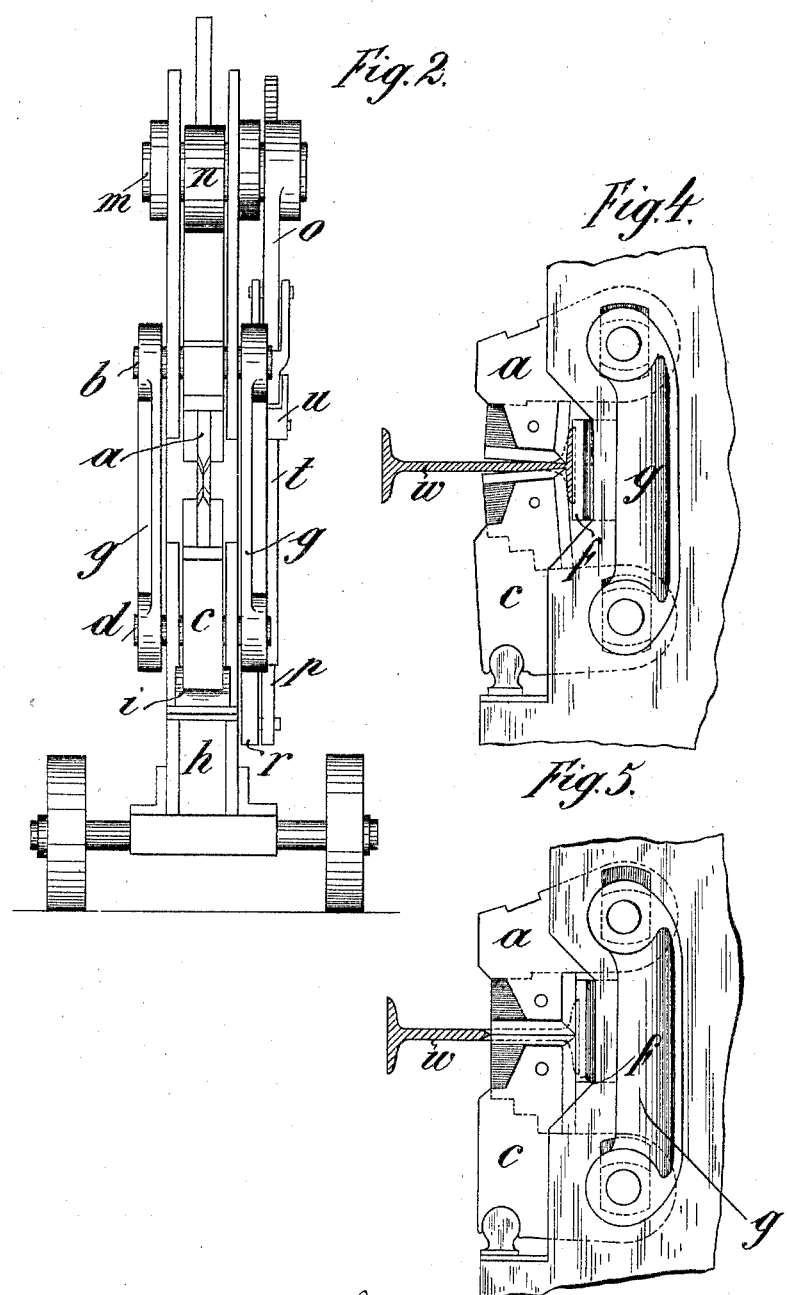

No. 776,091.

Patented November 29, 1904.

UNITED STATES PATENT OFFICE.

ROBERT SCHLEGELMILCH, OF ARTERN, GERMANY, ASSIGNOR OF ONE-HALF TO ACTIEN-MASCHINENFABRIK "KYFFHÄUSERHÜTTE," VORM. PAUL REUSS, OF ARTERN, GERMANY.

SHEARS FOR CUTTING T OR OTHER ANGLE IRON.

SPECIFICATION forming part of Letters Patent No. 776,091, dated November 29, 1904.

Application filed February 4, 1904. Serial No. 191,999. (No model.)

*To all whom it may concern:*

Be it known that I, ROBERT SCHLEGELMILCH, manager, a subject of the King of Prussia, Emperor of Germany, and a resident of Artern, Germany, have invented certain new and useful Improvements in Shears for Cutting T or other Angle Iron, of which the following is a specification.

This invention relates to improvements in shears for cutting T and other angle iron, more particularly to shears in which all the knives are sharpened like chisels, so that the cutting of the iron takes place through biting, the lateral knife being fixed and the upper and lower knife being oscillatory.

The characteristic feature of the improved shears consists in the fact that the pivots of the movable knives are connected to each other and are arranged in guide-slots which are approximately parallel with the lateral knife, the lower knife being supported by a movable pin arranged approximately vertically below the cutting edges in such a manner that although the lower knife is operated by the upper knife it has at the same time a positive operative movement. The point of engagement of the operating-lever by means of which the knives are moved is so arranged below the horizontal plane of the fulcrum of the said lever that the idle travel of the latter takes place while the lever-arm is increasing, whereas the effective shearwork takes place while the lever-arm is decreasing.

Figure 1:
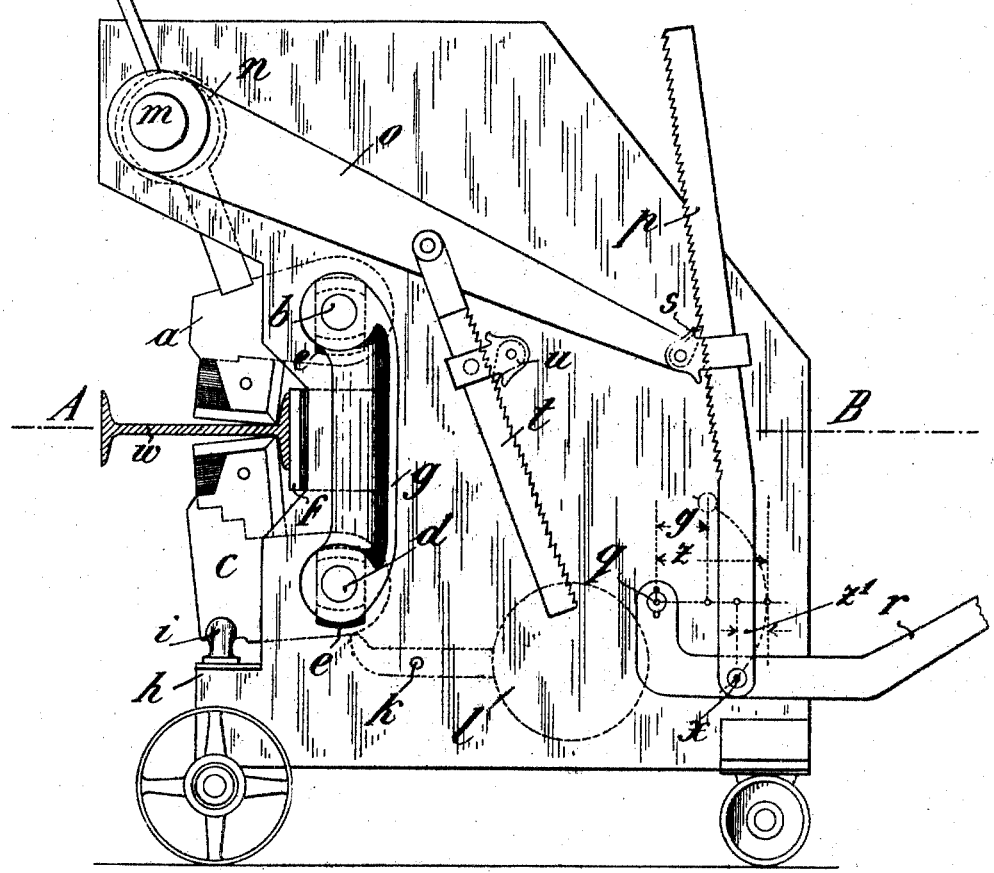
Figure 3:
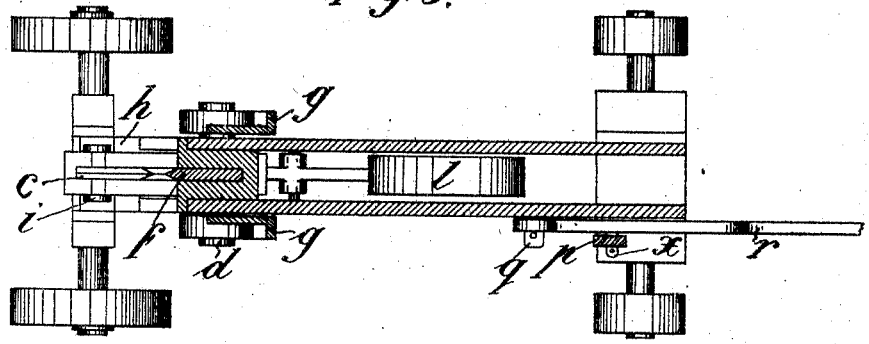

One form of the improved shears is illustrated in the annexed drawings as an example, Figures 1 and 2 being a side view and front view, respectively, and Fig. 3 a section on the line A B of Fig. 1. Figs. 4 and 5 represent the knives in different positions. In Figs. 2 and 3 the iron to be cut is omitted in order to show the construction more clearly.

The upper knife $a$ oscillates about the pivot $b$ and the lower knife $c$ about the pivot $d$, the said pivots being movable upward and downward in slots $e$ in the frame and which are substantially parallel to the lateral knife $f$, fixed to said frame. The pivots $b$ and $d$ are connected to each other by means of suitable rods $g$. The lower knife is also adapted to oscillate about the pivot $i$, which is horizontally slidable on the frame $h$ and is arranged approximately vertically below the cutting edges of movable knives. The automatic return movement of the lower knife can be produced by means of a balance-weight $l$, pivoted at $k$.

The operation of the upper knife is effected in the known manner by means of the cam $n$, pivoted at $m$ and operated by means of the arm $o$, fixed to its pivot, the rack $p$ and the operating-lever $r$ pivoted at $p$. Connection between the arm $o$ and the rack $p$ is made by means of the pawl $s$ in the usual manner. In order, however, to prevent the return of the arm $o$ with the cam during the shearing, the said arm $o$ is connected to a rack $t$, adapted to be engaged by the pawl $u$.

When the T-iron $w$ has been inserted in the manner shown in the drawings and a gradual rotation of the cam $n$ is produced by means of the lever $r$, the upper knife oscillates about its pivot, enters the iron, and at the same time presses the latter against the fixed lateral knife $f$ on the one hand and against the lower knife $c$ on the other hand. The said lower knife is thus caused to oscillate about the pivot $i$ and pull its pivot $d$ downward. Since the pivots $d$ and $e$ are connected to each other by the rods $g$, the upper knife is caused to perform not only an oscillatory movement, but also a relative downward movement, and by means of these movements uniform penetration of the knives into the T-iron is obtained, as shown in Figs. 4 and 5. When the iron has been cut half-way, it is turned round so that the other half can be cut in a similar manner. The positive connection of the upper knife to the lower knife is also necessary, for the reason that in its absence the cutting angle would change according to which of the knives was enabled by superior sharpness to enter farthest into the metal.

The effect of arranging the point of engagement of the operating-lever $r$ in the manner illustrated may be described as follows: The chisel-like cutting edges of the knives cause the latter to slightly recede from the material when the pressure ceases, so the pivots must have a certain amount of play in their bearings to give the required facility of action, and the lever system possesses a certain amount of unavoidable elasticity. All these factors together may be called the "idle travel" of the shears. If the point of engagement $x$ of the operating-lever were not below the pivot $q$ thereof, the idle travel would have to be overcome during the downward movement of the lever while the lever-arm was shortest, and the effective work, on the other hand, while the lever-arm was longest. In other words, the effective work of shearing would take place under the least favorable conditions of leverage. If, on the other hand, the fulcrum $x$ is below the horizontal plane of $q$, as shown in Fig. 1, the idle travel begins with the lever-arm $y$ and ends with approximately the lever-arm $z$, whereas the shearing work begins with the latter and terminates with a decreasing lever-arm, the latter being shortened by $z'$. The conditions can of course also be so made that the idle travel of the lever continues beyond the maximum of the effective lever-arm $z$, so that the shearing work does not take place until after the effective leverage has been shortened.

In small shearing apparatus, the supporting-pivot $i$ can be dispensed with, and the free end of the lower knife can be provided with a rib or the like adapted to slide directly on the frame.

Having thus described my invention, the following is what I claim as new therein and desire to secure by Letters Patent:

1. Shearing apparatus for cutting T and other angle iron, comprising a fixed lateral knife, an oscillating upper knife, an oscillating lower knife, and means for operating the knives, the pivots of the said upper and lower knives being positively connected to each other and guided in slots approximately parallel to the lateral knife, substantially as described.

2. Shearing apparatus for cutting T and other angle iron, comprising a fixed lateral knife, an oscillating upper knife, an oscillating lower knife, and means for operating the knives, the pivots of the said upper and lower knives being positively connected to each other and guided in slots approximately parallel to the lateral knife, the free end of the said lower knife being supported by a pivot arranged approximately vertically below its cutting edge and horizontally slidable in the frame, substantially as described.

3. Shearing apparatus for cutting T and other angle iron, comprising a fixed lateral knife, an oscillating upper knife and an oscillating lower knife, an operating-lever by means of which the knives are moved, the pivots of the said upper and lower knives being positively connected to each other and guided in slots approximately parallel to the lateral knife, and the point of engagement of the operating-lever being below the horizontal plane of the fulcrum of the said lever, substantially as described.

The foregoing specification signed at Berlin this 13th day of January, 1904.

ROBERT SCHLEGELMILCH.

In presence of—
HENRY HASPER,
WOLDEMAR HAUPT.